March 4, 1952

E. A. JONES 2,587,733

TEMPERATURE CONTROL SYSTEM

Filed Oct. 9, 1944

INVENTOR:
EDWIN A. JONES,
BY Kingsland Rogers & Ezell
ATTORNEYS.

March 4, 1952 — E. A. JONES — 2,587,733
TEMPERATURE CONTROL SYSTEM
Filed Oct. 9, 1944 — 2 SHEETS—SHEET 2

INVENTOR:
EDWIN A. JONES,
By Kingsland, Rogers & Ezell
ATTORNEYS.

Patented Mar. 4, 1952

2,587,733

UNITED STATES PATENT OFFICE 2,587,733

TEMPERATURE CONTROL SYSTEM

Edwin A. Jones, Webster Groves, Mo.

Application October 9, 1944, Serial No. 557,769

21 Claims. (Cl. 236—68)

The present invention relates to a control mechanism. More particularly, it relates to a control for heat-change producing devices so that they will operate at a proper rate in response to demand, will modulate to suit the demand, and, upon satisfaction of that demand, will become inoperative.

An object of the invention is to provide a modulating heat control having an on-and-off single pole space thermostat, a throttling relay operating as a function of the interval of the on-and-off cycle, a main cut-off, and means to effect operation of the main cut-off into its open or closed positions under control of the single pole space thermostat.

More particularly, an object is to provide the system aforesaid with a circuit for operating the main cut-off upon operation of the space thermostat operation demanding position, means to hold the main cut-off during modulating cycling of the space thermostat, and means to effect closure of the main cut-off when the demand for heat change is reduced below a predetermined point. A further object is to effect the last-named closure operation as a function of the time during which the space thermostat remains in a satisfied position.

It is a further object to provide the modulation by employment of a heat-responsive throttling device, with a heater therefor under control of the space thermostat, and a control for the main cut-off operated when the heat-responsive device moves to an extreme position under control of its heater. A further object is to provide a circuit breaking device for said last-named control, that is energized when the heat-responsive device moves to said extreme position, particularly where said circuit breaking device breaks a holding circuit for the main cut-off.

A further object is to provide a control of the type hereinbefore mentioned wherein, upon demand for heat change by the space thermostat, the heat-change means will be put in operation at a given rate of heat-change production, and will be adjusted from said rate to supply the heat-change losses of the space, with means to effect deenergization of the heat-change means when its minimum production exceeds the requirements of the space.

More particularly, an object is to provide a control having a single pole space thermostat, a main cut-off, and a throttling device, combined to effect opening of the main control by demand of the thermostat, holding of the main control, throttling of the heat-change device in accordance with cycling of the thermostat while the main control is held, and release of the holding of the main control when the throttling device is throttled downward a predetermined degree.

A further object is to provide a structure accomplishing the previous object which will stop the throttling action in the event the initial demand is renewed before the device is cut off.

A further object is to accomplish the result aforesaid by means of balanced heaters, one of which is disposed in a holding circuit around the space thermostat and is substantially shunted when the space thermostat is closed.

Figure 1:
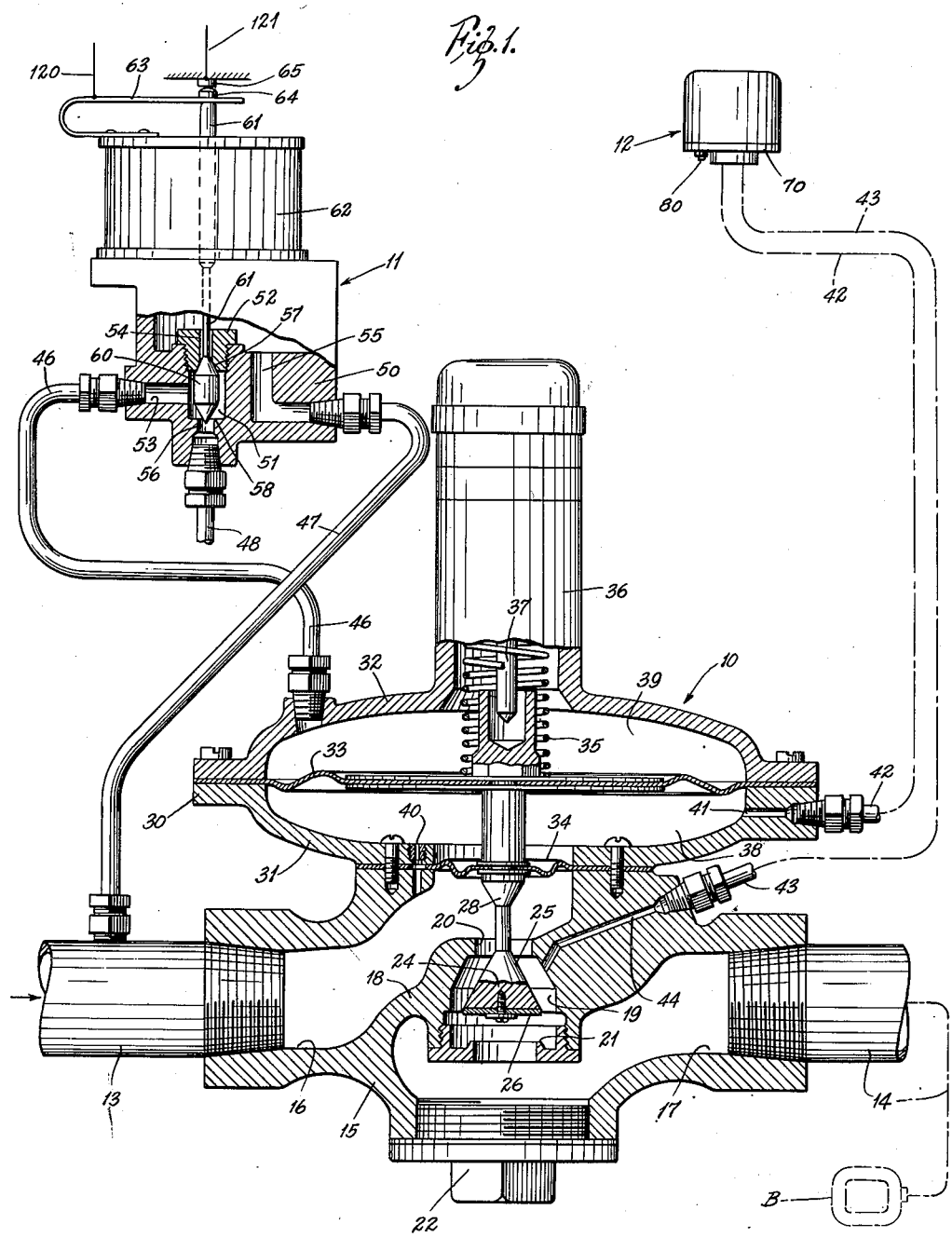
Fig. 1 is a view, partly in section, of the three valve parts of the device.
Figure 2:
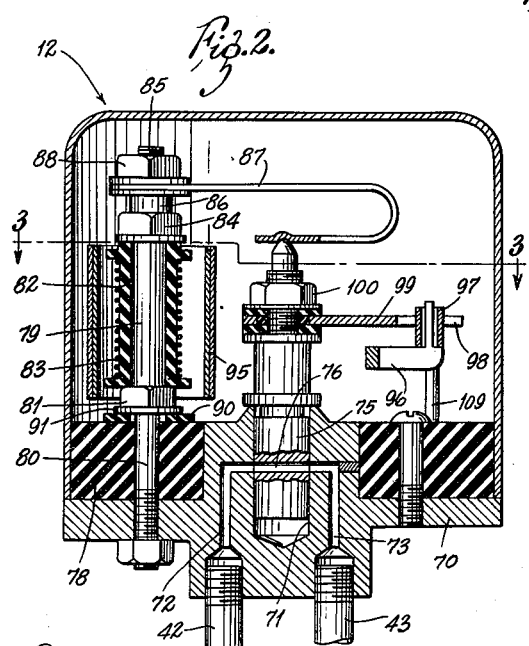
Fig. 2 is a vertical section of the throttling control valve and heat operated switch shown in Fig. 1.

To illustrate an application of the system, it is shown in connection with a diaphragm type modulating valve operated by a three-way valve and a throttling control valve. These are substantially the same as those in Patent No. 2,328,279, issued August 31, 1943, to this inventor. The diaphragm valve is generally indicated at 10, the three-way valve at 11, and the throttling control valve at 12.

The diaphragm valve 10 is attached to be interposed in a fuel supply line to provide the high pressure inlet 13 and the low pressure outlet 14, the latter being connected to a burner B. The valve 10 comprises a valve body 15 having an inlet portion 16 receiving the inlet line 13 and an outlet portion 17 returning to the outlet line 14. The inlet 16 and the outlet 17 are separated by a partition wall 18 formed to provide a valve chamber 19. The valve chamber 19 has a throttling port 20 on the inlet side and a cut-off seat 21 on the outlet side, the seat 21 being formed as an insert into the bottom of the chamber. A plug 22 closes an opening in the bottom of the valve housing 15 and is removable to give access to the parts.

Within the valve chamber 19 is a valve member 24 tapered on its upper side at 25 to cooperate with the port 20 and to throttle the port 20 in varying degrees in accordance with the vertical position of the valve. The valve 24 is also provided with a sealing portion 26 on its bottom side that is adapted to close against the seat 21 to cut off flow from the inlet 16 to the outlet 17. It is thus seen that when the valve 24 is in throttling position, the chamber 19 is at outlet pressure, but when the valve 24 is in seating position the chamber is at inlet pressure.

The valve 24 is supported by a valve stem 28 that projects upwardly from the housing 15. Above the housing is disposed a diaphragm mechanism 30, including a lower portion 31 and an upper portion 32, between which is clamped a diaphragm 33. The valve stem 28 is fixed to the center of the diaphragm 33. A second and sealing diaphragm 34 is sealed around the valve stem 28 and is clamped between the lower portion 31 of the diaphragm means 30 and the top of the valve housing 15. It will be seen that the last-mentioned portions 31 and 15 have registering openings that are closed off by the diaphragm 34.

Above the main diaphragm 33 is a spring 35 acting downwardly thereon. This spring extends into a projection 36 formed upwardly on the upper portion 32 and adapted to contain the familiar spring adjusting means so that the downward force exerted by the spring 35 may be regulated to suit the operating conditions. The part of the valve stem above the diaphragm is hollowed out and surrounds a pin 37 extending downwardly from the upper portion 32, to limit upward movement of the valve stem and the valve 24. The valve cannot throttle flow below the minimum required to sustain flame.

The foregoing construction provides a lower diaphragm chamber 38 and an upper diaphragm chamber 39, the two being sealed from each other and the lower diaphragm chamber being sealed from the inlet chamber 13 by the small diaphragm 34.

A constricted bleeder port 40 leads from the inlet 16 of the valve into the lower diaphragm chamber 38. A port 41 leading from the lower diaphragm chamber 38 is connected by a pipe 42 through the throttling control valve 12 and thence by a pipe 43 back into a port 44 extending within the valve body 15 to the valve chamber 19 between the port 20 and the seat 21.

The upper valve chamber 39 is connected by a pressure line 46 into the three-way valve 11 whence, as will appear, it may be connected to a pipe 47 connected to the pressure line 13, or to a pipe 48 exhausted to atmosphere.

The three-way valve 11 includes a valve body portion 50. This body portion has in it a valve chamber 51, the upper part of which is formed by an insert member 52. The valve chamber 51 is connected by a port 53 with the line 46. It is connected by a port 54 through the insert 52 with a chamber that, in turn, communicates with the port 55 leading to the inlet connection 47. The valve chamber likewise is connected by a port 56 with the atmospheric associated pipe 48.

The insert 52 has a valve seat 57 therein and opposed thereto at the bottom of the valve chamber 51 is a valve seat 58 at the entrance to the atmospheric exhaust port 56.

Within the valve chamber 51 is disposed a double acting valve member 60 adapted, when in its upper position, as shown, to open the valve seat 58 and close with the valve seat 57, and when in its lower position to open the valve seat 57 and to close with the valve seat 58. The valve 60 is mounted on a stem 61 extending within the port 54, without closing the same, up through a magnetic coil 62 which lifts the stem 61 to the position shown when the coil is energized, the valve stem 61 acting as an armature within the coil 62. The stem 61 is also adapted to lift a switch spring 63 mounted on top of the coil against its inherent downward resilience, to bring together two contacts 64 and 65. These contacts are thus closed when the coil 62 is energized, but open when the coil is deenergized.

The throttling control valve 12 includes a base portion 70 having a valve socket 71. A port 72 leads from the line 42 to the socket 71 and the port 73 connects the other pipe 43 with the socket 71.

A rotary valve plug 75 is mounted within the valve socket 71. This plug has a port 76 transversely across it and adapted to determine any communication between the ports 72 and 73.

The base 70 of the valve 12 has an insulating block 78 secured to it. Projecting upwardly from this block is a post 79. The lower part 80 of this extends downwardly through the insulating block 78 and is threaded through the base 70. A lock nut holds the post, below the base. A lower head 81 is provided above the projection 80, and spaced slightly above the upper surface of the insulating block 78, for a purpose to be described. Above the head 81 is disposed a sleeve 82 of heat resisting material. This sleeve 82 receives a heating coil 83 wound therearound. Above the sleeve 82 is a nut 84 that clamps the sleeve against the lower head 81. The post 79 is reduced at 85 to receive a spacer 86, a pair of washers between which a spring arm 87 is disposed, and a nut 88. The spring arm 87 extends outwardly across the top of the valve stem 75 and acts to hold that valve against upward movement.

The aforementioned spacing of the head 81 above the insulating block 78 provides space to receive a crank arm base 90. A spring washer 91 frictionally holds the crank arm against movement, the arrangement providing a slip friction connection for a purpose to appear.

A crank arm 94 of the member 90 supports the inner end of a bimetal convolution 95 coiled about the heater 83. The outer end of this bimetal 95 has an arm 96 fixed thereto. This arm extends beyond the valve stem 75 and has an upwardly projecting end supporting a roller 97. This roller engages within a slot 98 in an arm 99 that is rigidly clamped to the valve stem 75 by a nut 100 and suitable washers.

The arm 99 has an extension 101 that may engage the end of a switch plate 102 supported at 103 on the insulating block 78. This switch plate 102 has a contact 104 adapted to close with a contact 105 mounted on the insulating member 78 but normally urged away therefrom by the resiliency of the plate.

The support 103 of the switch plate 102 also has a connection 106 leading to the coil 83. The other lead 107 from this coil leads to a terminal 108 for external connection.

Movement of the arm 99 by the bimetal coil 95 in a clockwise direction is limited by closure of the contacts 104 and 105. Movement in the other direction is limited by a stop 109. If the bimetal demands more turning than these stops permit, the slip friction absorbs the same. The sweep of the arm 99 is limited to that necessary to operate the valve 75 through its full range. While the slip friction is not essential, it is desirable because it causes the device to respond more rapidly to temperature changes. For example, it causes an immediate reversal of the arm 99 upon reversal of the movement of the bimetal arm. Without a slip friction, the bimetal would have to cool to a predetermined temperature to reverse the arm 99.

Figure 4:
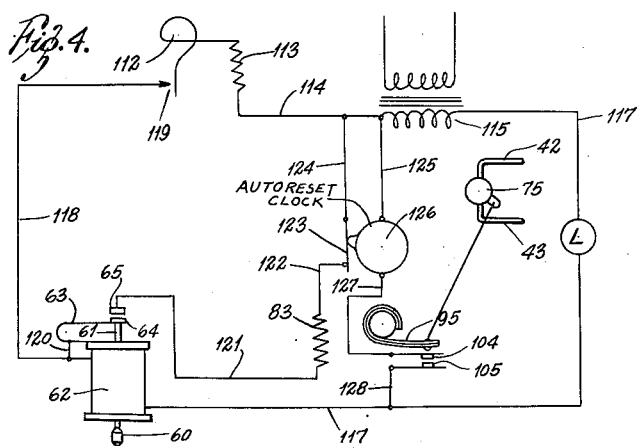
Fig. 4 is a wiring diagram of one form of the invention.

The electrical connections are shown in Fig. 4. Therein, a room thermostat 112 is located to control the temperature of the room being heated by the burner controlled by the main valve 10. The thermostat 112 has an anticipating heater 113 in series with it. A line 114 connects the anticipating heater 113 to the secondary 115 of a transformer. A line 117 leads from the other end of the transformer into the coil 62 from which a line 118 leads to the contact of the room thermostat 112. When the room thermostat cools off, it closes its switch 119.

The contact 64 on the spring blade 63 is connected by a line 120 to the line 118. The contact 65 is connected by a line 121 through the heater 83. From this heater, a line 122 leads to one contact of a clock operated switch 123, which, in turn, is connected by a line 124 to the secondary 115. A typical clock operated switch of the kind referred to in this application is the General Electric type TSA-10.

A line 125 leads into a timing motor 126, from which a line 127 leads into the bimetal 95 for electrical communication with the contact 104. The contact 105 is connected by a line 128 into the line 117.

*Operation*

The valve 24 seats against the seat 21 when the mechanism is in its inoperative position. Under these circumstances, the coil 62 of the three-way valve 11 is deenergized to port line pressure gas through the line 47 from the inlet pipe 13 to the valve 11. Thence it passes through the port 55 of the valve 11, the port 54 around the lowered valve 60, through the port 53 and the line 46, to the upper diaphragm chamber 39 of the main valve 10. The line pressure within the chamber 39 is always at least equal to the pressure in the chamber 38 under such circumstances, so that the spring 35 can seat the valve 24 on its seat 21, and thereby cut off communication between the inlet 13 and the outlet 14 to the burner. Under these conditions, as stated, the valve 60 within the three-way valve 11 is lowered.

During an off cycle, the valve plug 75 of the control 12 is turned to open position wherein the port 76 connects the port 72 and the port 73. This means that the port 44, within the main valve housing 15, is fully opened to the lower diaphragm chamber 38. When the valve 24 is seated on the seat 21, inlet pressure is present within the valve chamber 19 so that inlet pressure likewise exists in the chamber 38.

When the room thermostat 112 initially closes demanding heat, the main circuit is closed through the coil 62. Starting from the sceondary 115, this circuit includes the line 117, the coil 62, the line 118, the switch 119, the thermostat 112, the anticipating heater 113 and the return lead 114.

When the coil 62 is energized, it lifts the valve 60 and it closes the contacts 64 and 65.

When the valve 60 is lifted, it closes the seat 57 in the three-way valve 11 and opens the seat 58. When the seat 57 is closed, the inlet line 47 is blocked off. When the seat 58 is open, the chamber 39 is exhausted through the line 46, the port 53, the port 56 and the exhaust line 48. At this time, inlet pressure exists in the lower chamber 38 of the main valve 10. Consequently, the diaphragm 33 is lifted, raising the valve 24 from its seat 21 and introducing it to a greater or lesser degree into the port 20 to control the flow of gas therethrough. This throttling of the port 20 puts the valve chamber 19 at a pressure below inlet pressure, so that the pressure within the chamber 38 is reduced by bleeding out through the port 41, the line 42, the control 12, the line 43, and the port 44 into the low pressure valve chamber 19. The operation of this type of valve is described in detail in Letters Patent No. 2,328,279, issued August 31, 1943.

The closure of the contacts 64 and 65, by energization of the coil 62, closes a circuit from the primary 115 through the line 117, the coil 62, the line 120, the blade 63, the contacts 64 and 65, the line 121, the heater 83, the line 122, the presently closed switch 123 and the line 124. However, as long as the room thermostat switch 119 is closed, this last main circuit is relatively ineffective because the heater 83 has so much greater resistance than the anticipating heater 113 that the circuit through the room thermostat substantially shunts the holding circuit through the heater 83. In other words, little current runs through the heater 83, and no change is produced in the bimetal 95 during closure of both the main circuit and the holding circuit.

When the room approaches the desired temperature, the thermostat 112 will open the switch 119. This temperature point is anticipated by the anticipator 113. When the switch 119 opens, the holding circuit becomes effective to hold the coil 62 energized, maintaining the valve 60 up and the contacts 64 and 65 closed. With the main circuit open, the heater 83 then draws full current and begins to generate heat. As the heater 83 heats the bimetal 95, the same warps, and, through the medium of the arm 96 and the arm 99, twists the valve plug 75 to throttle communication between the lines 42 and 43. As the lower diaphragm chamber 38 of the main valve 10 communicates with the inlet side through the restricted passage 40, the throttling of the line 42 tends to increase the pressure within the diaphragm chamber 38 by reducing the bleed-off from this chamber. Thereupon the diaphragm 33 will rise, moving the valve 24 toward a position of greater throttling, so that the burner is reduced in its heat production.

If the reduction of heat supplied to the room during this interval causes the room to cool off to reclose the switch 119, the heater 83 will again become shunted and will cool. The bimetal 95 will correspondingly cool, and the valve plug 75 will be moved toward a position of greater flow, with the final result that the main valve 24 will move toward a more open position.

The foregoing cycling back and forth of the main valve 24 will maintain the heat production of the burner substantially at the amount necessary to maintain the room at constant temperature. It has been observed that the on-and-off cycling of the room thermostat may take place without even a clean break of the switch 119. The contact pressure variations are enough to cause the operating balance between the room thermostat and holding circuits to shift. If at any time the rate of heat loss changes in the room, the throttling valve will merely be caused to assume a different position under an equilibrium corresponding to the previous one.

If at any time the room becomes completely heated and the heat loss is such that the heated condition continues, resulting in continued energization of the heater 83, the bimetal 95 will move to such a position that the arm 101 is moved into contact with the blade 102, to close the contacts 104 and 105. When this occurs, the circuit through the clock motor 126 is started, and, after a predetermined period such as twenty minutes, it will withdraw from the switch 123 and permit that switch automatically to open. When this occurs, the holding circuit will be broken and the coil 62 will become completely deenergized. This will also cause the heater 83 to cool. The clock switch, being of the automatic spring reset type, will immediately recycle to starting position when the heater 83 cools to open the contacts 104 and 105.

If, during the time the timer clock is in operation (for instance if it is set for a twenty-minute cycle), but before that time has elapsed (say fifteen minutes after the contacts 104 and 105 have closed), the room thermostat should again call for heat, shunting the resistance 83, the heater will again begin to cool, breaking the contacts 104 and 105. This will permit the timer to reset, and, upon subsequent closure of these contacts 104 and 105 due to satisfaction of heating requirements by the minimum gas flow, a complete twenty-minute cycle will result before the switch 123 is opened to close the main valve.

The main valve is designed, as set forth in the patent referred to, to prevent full cut off when the control 20 is completely closed. When this occurs, the development of full line pressure in the lower diaphragm chamber 38 moves the diaphragm upwardly until it strikes the stop 37 so located that a flow adequate to support the burner operation is still supplied to the burner. If this exceeds the amount necessary to overcome heat losses in the room, the main thermostat will open after a predetermined time.

The limit switch L may be disposed, as shown, in the line 117. When it opens in response to maximum permissible temperature at at controlled point, the coil 62 will be deenergized despite demand of the room thermostat or of the holding circuit.

The foregoing control employs the timer 126, which effects a shut-off of the main valve following an interval after the control valve 75 has throttled to minimum flame conditions. While the control could have the contacts 104 and 105 directly in the holding circuit in series with the heater 83, and normally closed, but opened upon protracted heating of the heater 83, such control would lack the assurance of maintained cycling near the point of cut-off. The same may be said for a relay energized in place of the motor timer. The minimum flow point may be a modulation point, arrived at by relatively long on-and-off periods of the thermostat. For this reason, it is desirable to have the timer 126 to maintain the holding circuit for a period ample to permit the thermostat to reclose for modulation, without having to go through a complete recycle, requiring re-modulation from maximum flow down.

Figure 5:
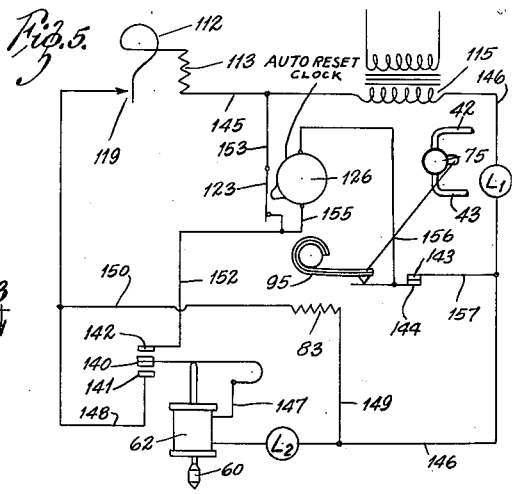
Fig. 5 is a wiring diagram of a second form of the invention.
Figure 3:
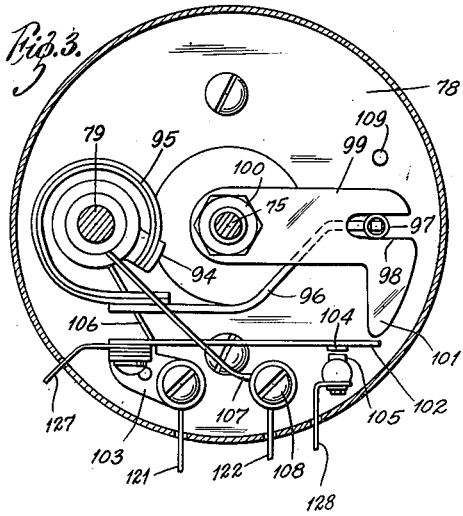
Fig. 3 is a horizontal section taken on the line 3—3 of Fig. 2.

*Modification in Fig. 5*

A modification of this control is shown diagrammatically in Fig. 5. In it, the various circuit elements are substantially the same but are connected differently. It has the room thermostat 112, the anticipating heater 113, the secondary 115, the coil 62, the bimetal 95, operated by the heater 83 and also operating the plug 75.

In this control, the switch, operated by the coil 62, is a double throw switch for a double contact 140 normally urged to close with the contact 141 when the coil 62 is deenergized and lifted to make with the contact 142, and then break with the contact 141 when the coil 62 is energized.

In this control, the bimetal 95 breaks the contacts 143 and 144 when the heater 83 becomes heated. In this control, too, the clock motor 126 is operated to a position to move the switch 123 to open position after the clock motor has been energized a period of time. When the clock motor is deenergized, it is spring returned to position releasing the switch to closed position.

The anticipating heater is connected by a line 145 to the secondary 115, from which a line 146 leads through limit switches L1 and L2 to the coil 62. The other end of the coil is connected by a line 147 with the switch arm 63. The contact 141 of this switch is connected by a line 148 into the switch 119 of the thermostat 112.

The heater 83 is connected by a line 149 interposed into the line 146 and by a line 150 interposed into the line 148.

The holding circuit terminates at one end in the contact 142, and includes a line 152 to the switch 123, from which a line 153 leads to the line 145.

The circuit to the clock motor 126 is connected to the line 152 by a line 155. It is connected to the contact 144 by a line 156. The contact 144 is normally urged into contact with the contact 143, but is moved away therefrom when the bimetal 95 is heated. The contact 143 is connected by a line 157 with the line 146.

The limit switches L1 and L2 are responsive to critical temperature points in the system, such as are well known in the art.

*Operation of Fig. 5*

At the start, the circuit is in the position shown in Fig. 5 and the room is warm. When the room thermostat 112 closes the switch 119, a starting circuit through the coil 62 is established from the secondary through the line 146, the coil 62, the line 147, the blade 63, the contacts 140 and 141, the line 148, the switch 119, the thermostat 112, the anticipator 113, and the line 145. This energizes the coil 62 to pull the valve 60 up to effect opening of the main valve 10, and to close the contact 140 with the upper contact 142, and then open the same with the contact 141, in the order named.

In this case, the pilot valve 60 opens the upper diaphragm chamber 39 to exhaust and permits the diaphragm to lift. The bimetal 95 is so connected with the plug 75 that with the bimetal cold the plug 75 is closed. Consequently the line pressure present in the lower diaphragm chamber 38 will immediately move the main valve 24 through its wide open position and into its maximum throttling or minimum flow position.

As the room thermostat closes, the heater 83 is immediately put in circuit in parallel with the coil 62. It begins to generate heat to move the coil 95. However, at the start, with the coil 95 cold, the contacts 143 and 144 are closed. They establish a circuit from the line 155 through the motor 126 to the line 156, the contacts 143 and 144, and the line 157. The clock 126 will start to rotate, but normally this will have no effect, as the clock will not open the switch until a period of time, such as twenty minutes, elapses.

As long as the room thermostat remains closed, the heater 83 is in circuit, influencing the bimetal 95 to rotate the valve plug 75 to an increasingly open position. This effects a reduction of the pressure in the main diaphragm chamber 38 and increases the flow of fuel through the main valve 10. Thus the production of heat by the burner is increased.

Also, as soon as the bimetal 95 begins to heat and to move the valve plug 75 away from effecting minimum flow through the main valve 10, it will break the contacts 144 and 143, to release the clock motor back to its starting position. This normally occurs prior to the time the clock opens the switch 123. When it does occur, it is necessary for the clock to reoperate for its full interval before opening the switch.

When the room thermostat 112 opens under the influence of increasing ambient temperature and the anticipator 113, the heater 83 is cut out of circuit. It thereupon cools and the bimetal 95 moves the valve plug 75 toward an increasingly closed position, which action is converted by the main valve 10 into the reduced flow of fuel to the burner.

The result is that the room thermostat will normally assume a position wherein it oscillates between open and closed position (or oscillates between high and low contact pressures), producing just enough variation in the main burner operation to maintain a given temperature in the room for a given heat loss rate. Due to the greater mass of bimetal 95 and associated elements, this is more nearly a fixed intermediate position. If the rate of heat loss increases or decreases, the room thermostat will stay closed or remain open a greater time until a new equilibrium position is established.

If the rate of heat loss is reduced so much that the room thermostat remains open until the bimetal 95 cools to a position to reclose the contacts 143 and 144, the clock motor 126 will again be started and, after a predetermined lapse of time, the switch 123 will be opened. The moment it opens, it breaks the holding circuit to release the valve coil 62 and the mechanism returns to its inactive position.

The limit switch L1 is set to open at some critical temperature of one part of the system. When it opens, the entire system is shut down until it recloses. The heater 83 will necessarily cool so that the contacts 143 and 144 will reclose, setting the mechanism in position for a complete recycle when the temperature is lowered to normal. Likewise, the valve 75 will be throttled back to closed position. The valve 60 will drop to its starting position wherein the main valve 24 is closed.

The limit switch L2 may be disposed at another critical point. However, when it opens, only the coil 62 is taken out of circuit. This will result in closing of the main valve, but will not take the heater 83 out of circuit. Then, when the limit switch L2 recloses, the mechanism can start up under full flame conditions.

It will be observed that the clock motor cutoff adds to the system of Fig. 5 in a way similar to its action in the earlier form. While the broad functions of the system of Fig. 5 would be obtained without a timing clock, it is preferable to have it included, as it provides final cut after a period of minimum operation.

The described control systems all have the functions of throttling a modulating or other similar regulating valve in response to opening and closing cycling of a space thermostat. They combine this with control of a main cut-off, without interposition of additional thermostatic switches. The result is that the temperature at which the space is controlled does not vary for different rates of heat loss, as in the ordinary modulator. The positioning of the control valve becomes a function of the time the room thermostat remains satisfied or dissatisfied, and this, in turn, is a function of rate of heat loss.

Figure 6:
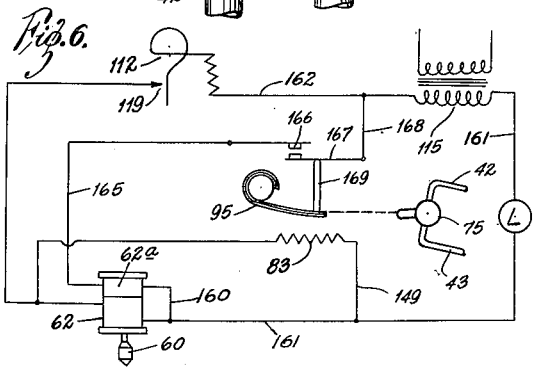
Fig. 6 is a wiring diagram of a system similar to that of Fig. 5, but somewhat modified.

Modification of Fig. 6

Fig. 6 shows a control that functions much the same as Fig. 5, but does not require the clock motor, and employs a pull-hold valve to eliminate the necessity of the switch operated by the coil 62. The holding circuit is held through a switch operated directly by the throttling bimetal.

In Fig. 6, the circuits through the thermostat switch 119 include a series circuit through the pull coil 62, and a circuit through the heater 83 in parallel with the coil 62. The heater 83 and the coil 62 are thus put in circuit whenever the thermostat 112 closes its switch.

The holding circuit in this modification includes a hold coil 62a, of such strength as to hold the valve 60 up, but of insufficient strength to pull it up. This hold coil 62a is connected by a line 160 with the line 161 leading to the secondary 115. The secondary 115 is connected by a line 162 to the thermostat switch 119. The other end of the coil 62a is connected to a line 165 leading to a switch terminal 166 of a normally open switch 167. The switch blade 167 is connected by a line 168 to the lead 162. The blade 167 is adapted to be displaced into contact with the contact 170 when the bimetal 95 heats up, there being a connector such as the pin 169 operated by the movements of the bimetal for impinging upon the blade 167. In this diagram, the bimetal 95 moves the pin upwardly upon heating.

Operation of Fig. 6

In operation of the modification of Fig. 6, at the start the room thermostat is open, the coils deenergized, the bimetal 95 cold, and the switch 167 open. Upon demand for heat at the thermostat 112, the switch 119 will close. This establishes a circuit through the main coil 62 to open the valve 60, start the burner, and set it at minimum flame. It also starts the heater 83 to generate heat. When the bimetal 95 is heated to a value above room temperatures, it will close the switch 167 to establish the holding circuit through the hold coil 62a, so that the valve 60 will not close until the holding circuit is broken.

Thereafter, continued heating of the bimetal 95 will cause it to modulate the valve 75 to increase the heat output of the burner. This modulation action will be the same as in Fig. 5.

If minimum flame produces excessive heat, the thermostat switch 119 will remain open long enough to let the heater 83 cool, and in turn to let the bimetal 95 cool. When the bimetal 95 cools to a point substantially below minimum flame position, it will reopen the switch 167 and break the holding circuit, causing the valve 60 to close.

It is evident that the pull-hold coil may be employed in place of the relay operated switches, and that the clock may be eliminated by substituting the foregoing direct action of the bimetal. However, the advantages of using the clock are evident, such as its assuring that the holding circuit will not be inadvertently opened when the control is cycling for modulation at the minimum flow point. This advantage of the clock is more important with the series heater of Fig. 4 than with the parallel heater of Figs. 5 and 6.

In the event that mechanical or electrical failures occur, the control is not unsafe, because the worst result would be operating on the limit switch L, L₁ or L₂.

It is evident that the valve 60, although a pilot valve in the illustration, could be a direct valve in the line. Also, types of modulating valves or means may be used other than that shown. For illustration, the throttling mechanism and cut-off mechanism need not necessarily be parts of a common diaphragm valve. The cut-off valve may be a separate structure, such as a magnetic valve, and the throttling valve may be any suitable type of throttling mechanism in series with the cut-off valve. The type of fuel being controlled will usually be of the fluid type—gas or oil—but the control is capable of use in many of its aspects with other fuels.

What is claimed is:

1. In a control for a heat-change producing device, a thermostat subject to heat changes produced, a switch moved to operating and non-operating positions by movements of the thermostat, an adjusting control device to vary the heat changes produced, a main cut-off including an operating device therefor, a switch operated by movement of the main cut-off to operating position to permit production of heat changes at the thermostat, a thermostat circuit including the thermostat switch and the main cut-off operating device to effect opening of the cut-off to operating position aforesaid upon demand by the thermostat, a holding circuit for the cut-off operating device including the switch operated upon operation of the cut-off, said holding circuit being adapted to hold the cut-off in operative position when the thermostat opens, means to operate the adjusting control device in response to opening and closing of the thermostat, and delayed action means energized by operation of the thermostat to satisfied position, said delayed action means being effective to open the holding circuit when the thermostat remains in satisfied position a predetermined time.

2. In a control for a heat-change producing device, a thermostat subject to heat changes produced, a switch moved to operating and non-operating positions by movements of the thermostat, an adjusting control device to vary the heat changes produced, a main cut-off including an operating device therefor, a switch operated by movement of the main cut-off to operating position to permit production of heat changes at the thermostat, a thermostat circuit including the thermostat switch and the main cut-off operating device to effect opening of the cut-off to operating position aforesaid upon demand by the thermostat, a holding circuit for the cut-off operating device including the switch operated upon operation of the cut-off, said holding circuit being adapted to hold the cut-off in operative position when the thermostat opens, means to operate the adjusting control device in response to opening and closing of the thermostat, and delayed action means energized by operation of the thermostat to satisfied position, said delayed action means being effective to open the holding circuit when the thermostat remains in satisfied position a predetermined time, and comprising a timing device, and a switch in the holding circuit operated thereby, the timing device being adapted to open the switch a predetermined time after the timing device is energized.

3. In a control for a heat-change producing device, a thermostat subject to heat changes produced, a relatively low resistance anticipating heater for said thermostat, a main cut-off for the heat-change producing device and including an operating device for operating the main cut-off, a holding switch operated by the cut-off when the same is moved to one position, a thermostat circuit including the thermostat, the anticipating heater and the main cut-off operating device, said circuit being adapted to be closed when the thermostat closes, to effect operation of the main cut-off into position to permit production of heat changes at the thermostat, a heat-responsive device to adjust the flow of heat-change producing medium, a relatively high resistance heater for operating the heat-responsive device, a holding circuit including the cut-off operating device, the holding switch and the high resistance heater, said holding circuit being closed by operation of the main cut-off, but being substantially shunted to the point of ineffectiveness when the thermostat circuit is closed, and being rendered effective to generate heat in the heater when the thermostat circuit is opened at the thermostat, whereby to move the heat-responsive adjusting device, and means operated by generation of a predetermined heat in the high resistance heater to break the holding circuit.

4. In a control for a heat-change producing device, a thermostat subject to heat changes produced, a relatively low resistance anticipating heater for said thermostat, a main cut-off for the heat-change producing device and including an operating device for operating the main cut-off, a holding switch operated by the cut-off when the same is moved to one position, a thermostat circuit including the thermostat, the anticipating heater and the main cut-off operating device, said circuit being adapted to be closed when the thermostat closes, to effect operation of the main cut-off into position to permit production of heat changes at the thermostat, a heat-responsive device to adjust the flow of heat-change producing medium, a relatively high resistance heater for operating the heat-responsive device, a holding circuit including the cut-off operating device, the holding switch and the high resistance heater, said holding circuit being closed by operation of the main cut-off, but being substantially shunted to the point of ineffectiveness when the thermostat circuit is closed, and being rendered effective to generate heat in the heater when the thermostat circuit is opened at the thermostat, whereby to move the heat-responsive adjusting device, and means operated by generation of a predetermined heat in the high resistance heater to break the holding circuit, said last-named means including a power device, and a circuit therefor that is closed by movement of the heat-responsive device in response to a predetermined high heat of its heater, and a switch in the holding circuit opened by operation of the power device.

5. In a control for use with a heating device, a space thermostat, a main fuel valve, an electrical means energizable to open the valve, a holding switch closed by energization of the electrical means, an adjusting fuel valve means adapted to adjust the fuel supply to the heating device, a thermostat circuit closed when the thermostat is closed, said circuit including the main valve electrical means, a holding circuit closed by the holding switch and including the electrical means, power means operated by effective energization of the holding circuit to effect movement of the adjusting fuel valve in one direction and movable in the other direction upon deenergization of the holding circuit, and circuit breaking means in the control rendered operative by operation of the power means to a predetermined extreme position for breaking the holding circuit.

6. In a control for use with a heating device, a space thermostat, a main fuel valve, an electrical means energizable to open the valve, a holding switch closed by energization of the electrical means, an adjusting fuel valve means adapted to adjust the fuel supply to the heating device, a thermostat circuit closed when the thermostat is closed, said circuit including the main valve electrical means, a holding circuit closed by the holding switch and including the electrical means, power means energized by effective energization of the holding circuit to effect movement of the adjusting fuel valve in one direction and movable in the other direction upon deenergization of the holding circuit, means operated by operation of the power means to a predetermined extreme position for breaking the holding circuit, said power means comprising a heat-responsive device, and a heater in the holding circuit for operating said device, said holding circuit having a higher resistance than the thermostat circuit whereby the heat produced by the heater is reduced upon closure of the thermostat circuit, and increased upon opening thereof.

7. In a control for use with a heating device, a space thermostat, a main fuel valve, an electrical means energizable to open the valve, a thermostat circuit means including the electrical means for opening the valve, a fuel throttling device, power means to operate the throttling device in opposite directions, electrical means under control of the space thermostat for operating the power means to effect operation of the power means in opposite directions as the thermostat moves between open and closed positions, a holding circuit means energized by operation of the main valve electrical means to hold the said eletcrical means in operation when the thermostat cycles between open and closed positions, and circuit breaking means in the control rendered operative by movement of the power means to an extreme position to break the holding circuit means.

8. In a control for use with a heating device, a space thermostat, a main fuel valve, an electrical means energizable to open the valve, a thermostat circuit means including the electrical means for opening the valve, a fuel throttling device, power means to operate the throttling device in opposite directions, electrical means under control of the space thermostat for operating the power means to effect operation of the power means in opposite directions as the thermostat moves between open and closed positions, a holding circuit means energized by operation of the main valve electrical means to hold the said electrical means in operation when the thermostat cycles between open and closed positions, and means operated by movement of the power means to an extreme position to break the holding circuit means comprising a clock motor, and a switch in the holding circuit opened by the clock motor after a predetermined period of operation of the motor.

9. In a control for use with a heating device, a space thermostat, a main fuel valve, an electrical means energizable to open the valve, a thermostat circuit means including the electrical means for opening the valve, a fuel throttling device, power means to operate the throttling device in opposite directions, electrical means under control of the space thermostat for operating the power means to effect operation of the power means in opposite directions as the thermostat moves between open and closed positions, a holding circuit means energized by operation of the main valve electrical means to hold the said electrical means in operation when the thermostat cycles between open and closed positions, and means operated by energization of the electrical means of the power means, for a predetermined period, to break the holding circuit means.

10. In a control mechanism for use with a fuel burning heater, a main fuel cut-off, a space thermostat to control the burner and responsive to heat produced by it, a pull coil for opening the main cut-off, a hold coil for holding the main cut-off open, modulating mechanism for varying the fuel supply to the burner, including a heater and a bimetal responsive to heat produced thereby, and a switch operated by the bimetal, a starting circuit including the thermostat and the pull coil, a circuit to the heater energized upon closure of the thermostat, a holding circuit through the hold coil and the bimetal switch, said bimetal being adapted to close its switch and close the holding circuit only after it is heated by the heater to a temperature above room temperature, and means operated by movement of the bimetal to modulate the fuel supply.

11. In a control for a burner, a space thermostat movable in opening and closing cycle phases, a fuel flow control valve, opening mechanism for said valve, a fuel flow throttling device, including a heater and a heat-responsive device, said valve opening mechanism being connected for operation to open the valve by closure of the thermostat, means to hold the valve opening mechanism in operation as aforesaid despite subsequent opening of the thermostat, said throttling mechanism heater being connected to produce heat when the thermostat is in one cycle phase and to reduce its heat production when the thermostat is in its other cycle phase, whereby the throttling device will reduce fuel flow when the thermostat is open, and release means to release the holding means of the valve operating mechanism, said release means having elements connected with the heat-responsive device and actuated thereby when the heat in the heater thereof reaches an extreme resulting from an excessive period of opening of the thermostat, the said elements of the release means when so actuated being adapted to cause the release means to release the holding circuit.

12. In a control mechanism for a heat-change producing device, a thermostat operable to demanding and satisfied positions in response to heat changes produced by the heat-change producing device, adjustable means movable for regulating the heat-change producing device to vary the heat change produced, slowly acting means to produce movement of the adjustable means in one direction when energy to the slowly acting means is increased and in the other direction when said energy is decreased, means including the thermostat in demanding position to increase energy to the slowly acting means, and in satisfied position to decrease said energy, means to stop operation of the heat-change producing device, and means operatively connected with the adjusting means to be moved thereby, to cause the stopping means to stop the heat-change producing device when the adjusting means moves to position wherein it decreases the heat change to a predetermined minimum operating value.

13. In a control apparatus for use with a means to deliver a heat-change producing medium to a space, a thermostat in the space, means to modulate the medium to adjust the delivery of heat change to the space, means responsive to operation of the thermostat to heat-change demanding position to operate the modulating means in a direction to deliver greater heat change, and responsive to operation of the thermostat oppositely, to operate the modulating means to deliver less heat change, means limiting the modulating means to a predetermined minimum heat-change delivery, and means to cut off delivery, said means including timing means energized in response to operation of the modulating means at its minimum and cut-off means operated after operation of the timing means for a predetermined time.

14. A method of controlling temperature of an enclosed space by regulation of the delivery of a heat-changing medium thereto; including the steps of delivering the medium to the space at rates within maximum and minimum limits, and modulating the delivery between said limits to overcome the heat changes through the walls of the enclosure, and stopping delivery of such medium after the delivery of the same has been at minimum rate for a predetermined period of time.

15. In an apparatus for regulating temperature of an enclosed space; heating means; control mechanism to modulate the operation of the heating means between maximum and minimum rates of heat delivery to the space, and to stop the heating means, the mechanism including a space thermostat and means to modulate the operation of the heating means between maximum and minimum rates to maintain the temperature of the space at a value set by the thermostat, and means in the control mechanism including timing means actuated in response to operation of the modulating means to operate the heating means at its minimum rate, to set a maximum period of operation of the heating means at its minimum rate, and to stop the heating means after operation at minimum rate for such period.

16. In an apparatus for regulating temperature of an enclosed space; heat-change producing means; control mechanism to modulate operation of the heat-change means between maximum and minimum rates of heat-change production in the space, and to stop production of heat-change in the space; the mechanism including a space thermostat and means to modulate operation of the heat-change means between its maximum and minimum rates to maintain the temperature of the space at a value set by the thermostat, and means in the control mechanism including timing means actuated in response to operation of the modulating means to operate the heat-change means at its minimum rate, to set a maximum period of operation of the heat-change means at its minimum rate, and to stop operation of the heat-change means after operation at minimum rate for such period.

17. In an apparatus for regulating operation of a heat-change producing means to maintain a predetermined temperature in an enclosed space by modulating operation of the heat-change means between maximum and minimum rates of heat-change production in the space, and by stopping said heat-change means; the combination of a control mechanism having a movable control means movable between maximum and minimum positions and connectible to the heat-change means to produce operation thereof corresponding to the position of the control means, and a space thermostat to position the movable control means in accordance with the requirements for heat-change within the space, timing means rendered operative when the control means operates to its minimum position to start a time interval, and means to stop operation of the heat-change means after a predetermined time interval of operation of the control means.

18. In a control mechanism for a heat-change producing device for regulating temperature in an enclosed space; the combination of a space thermostat, a cut-off device operable to "on" and "off" positions for controlling whether the heat-change device shall operate or not; a modulating device for varying the operation of the heat-change device between maximum and minimum rates of heat change for the space; a timing device; means connecting the space thermostat to the cut-off device to operate the same to "on" position upon predetermined demand for heat change in the space; means connecting the space thermostat to the modulating device to cause the same to modulate operation of the heat-change means between maximum and minimum positions to counteract heat transfer between the enclosure and its surroundings; means to cause the timing means to start a timing period upon operation of the modulating means to minimum position, and the timing means having means to operate the cut-off means to off position after a predetermined timing period.

19. In a control mechanism for a heat-change producing device for regulating temperature in an enclosed space; the combination of a space thermostat, a cut-off device operable to "on" and "off" positions for controlling whether the heat-change device shall operate or not; a modulating device for varying the operation of the heat-change device between maximum and minimum rates of heat change for the space; a timing device; means connecting the space thermostat to the cut-off device to operate the same to "on" position upon predetermined demand for heat change in the space; means connecting the space thermostat to the modulating device to cause the same to modulate operation of the heat-change means between maximum and minimum positions to counteract heat transfer between the enclosure and its surroundings; means to cause the timing means to start a timing period upon operation of the modulating means to minimum position, and the timing means having means to operate the cut-off means to off position after a predetermined timing period, the timing means having reset means to start a new timing period if the modulating means moves from minimum position before the end of one timing period.

20. In a control for a heat-change producing device to regulate the temperature of a space, a thermostat subject to heat changes produced, a switch moved to operating and non-operating positions by movements of the thermostat, an adjusting control device movable through a range of positions to vary the heat changes produced, a main cut-off mechanism comprising stopping means to cause the heat-change device to cease operation and a main control device for operating said means, said control device being adapted to be operated through said switch, a holding switch operated by operation of the main control device, a thermostat circuit including the thermostat switch in operating position and the main control device to actuate the cut-off mechanism to initiate operation of the heat-change device, a holding circuit for the cut-off operating device including the holding switch, said holding circuit being adapted to hold the cut-off mechanism in said operated position when the thermostat moves to non-operating position, means to operate the adjusting control device in response to opening and closing of the thermostat, and means to break the holding circuit operated by the adjusting control device, the adjusting control device and the said means being connected so that the adjusting control device renders the breaking means operable to open the holding circuit when the adjusting control device moves to minimum heat-change position.

21. In a control for a heat-change producing device, a thermostat subject to heat changes produced, a switch moved to operating and non-operating positions by movements of the thermostat, an adjusting control device to vary the heat changes produced, a main cut-off operable to heat-change producing position and to position preventing production of heat changes, the main cut-off having an operating device, a switch operated by movement of the main cut-off to heat-change producing position, a thermostat circuit including the thermostat switch and the main cut-off operating device to effect operation of the cut-off to heat-change producing position upon demand by the thermostat, a holding circuit for the cut-off operating device including the switch operated upon said operation of the cut-off, said holding circuit being adapted to hold the cut-off in said position, when the thermostat opens, means to operate the adjusting control device in response to opening and closing of the thermostat, and timing means rendered operative when the thermostat is satisfied, and circuit opening means operated after a predetermined period of operation of the timing means for effecting opening of the holding circuit.

EDWIN A. JONES.

REFERENCES CITED

The following references are of record in the file of this patent:

UNITED STATES PATENTS

| Number | Name | Date |
|---|---|---|
| 1,784,538 | Raymond | Dec. 9, 1930 |
| 2,112,218 | Gille | Mar. 22, 1938 |
| 2,164,511 | Furlong | July 4, 1939 |
| 2,221,164 | Denison et al. | Nov. 12, 1940 |
| 2,282,180 | Gille | May 5, 1942 |
| 2,287,788 | Diekhoff | June 30, 1942 |
| 2,348,969 | Gauger | May 16, 1944 |
| 2,447,901 | DeLancey | Aug. 24, 1948 |